Sept. 17, 1935.  G. W. PIERCE  2,014,412
MAGNETOSTRICTIVE TRANSMITTER
Original Filed July 20, 1928   2 Sheets—Sheet 1
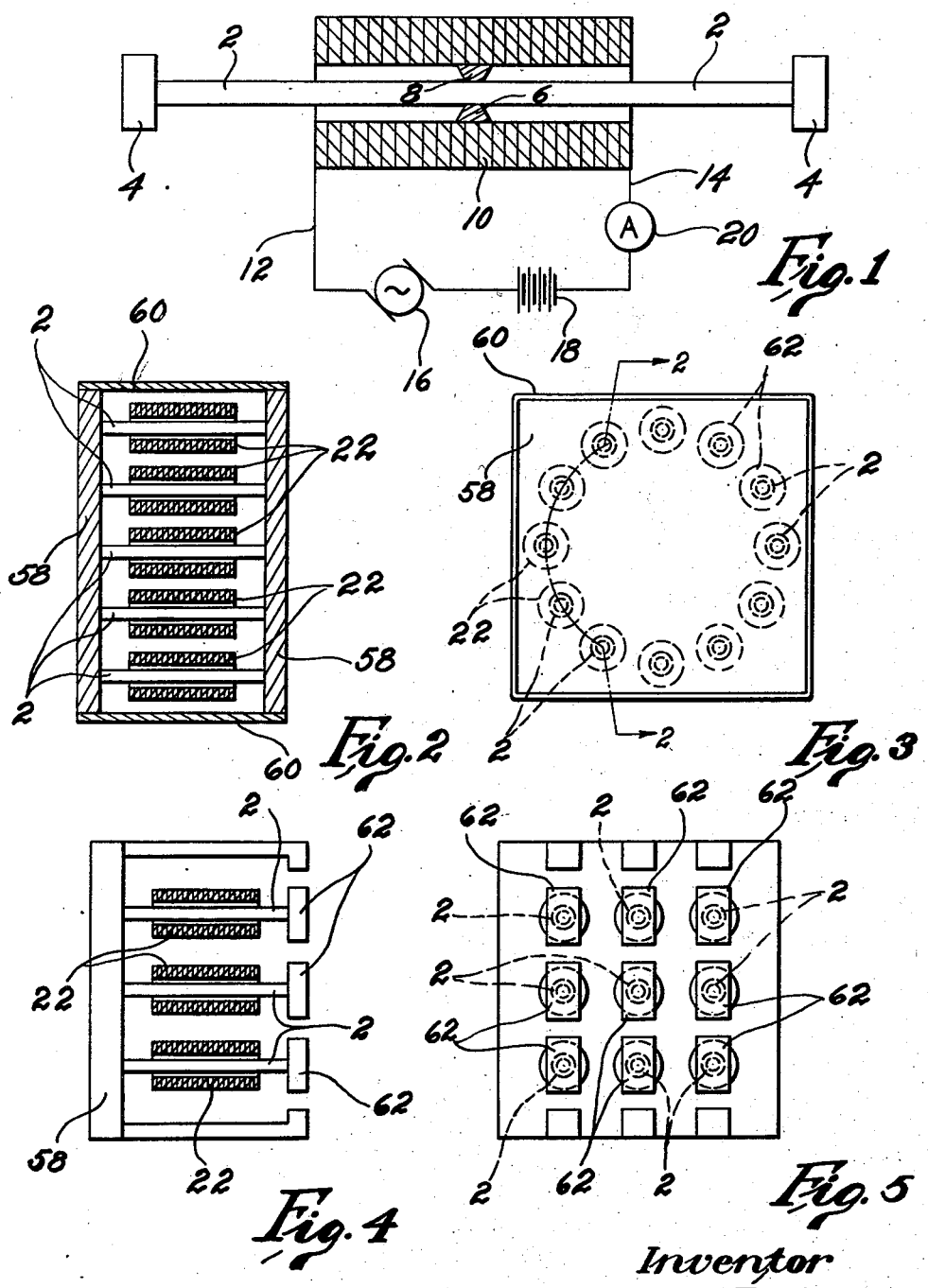
Inventor
George W. Pierce
By David Rives
Attorney Sept. 17, 1935.    G. W. PIERCE    2,014,412
MAGNETOSTRICTIVE TRANSMITTER
Original Filed July 20, 1928    2 Sheets-Sheet 2
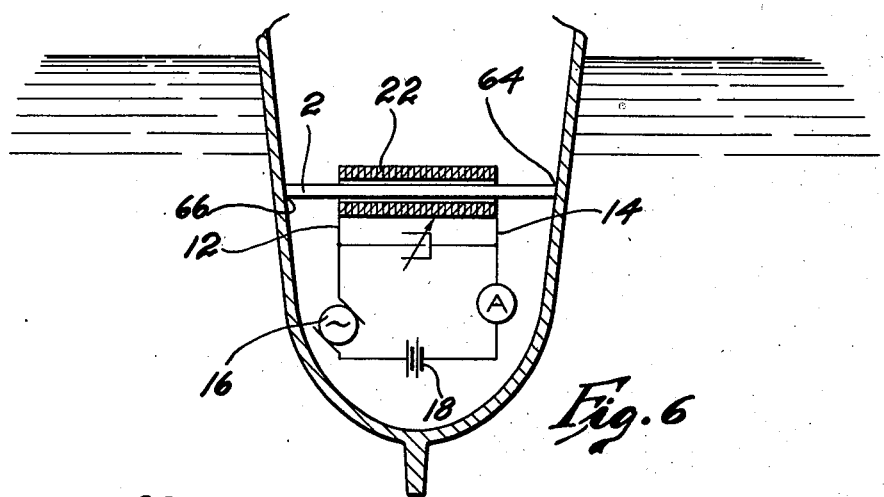
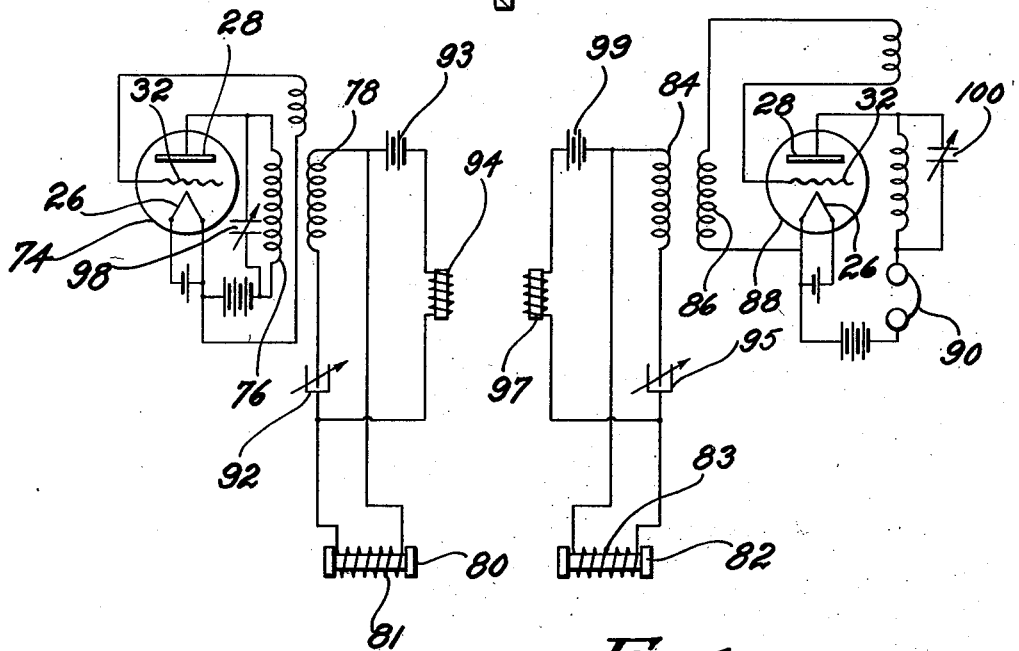
Inventor
George W. Pierce
By David Rines
Attorney Patented Sept. 17, 1935

2,014,412

UNITED STATES PATENT OFFICE 2,014,412

MAGNETOSTRICTIVE TRANSMITTER

George Washington Pierce, Cambridge, Mass.

Original application July 20, 1928, Serial No. 294,283. Divided and this application November 19, 1930, Serial No. 496,809. In Canada December 31, 1927

5 Claims. (Cl. 177—386)

The present invention relates to the transmission of intelligence, using sound as the agency of communication, and more particularly to communication by sound through water or other dense media. The present application is filed in response to requirements for division made by the Patent Office in application Serial No. 294,283, filed July 20, 1928, and in the parent application of the same, Serial No. 158,452, filed January 3, 1927, which matured, on March 11, 1930, into Letters Patent No. 1,750,124.

A feature of the invention is the use of tuned magnetostrictive vibrators. Magnetostrictive vibrators are constituted of a magnetostrictive core disposed in an electromagnetic field, such as may be produced by a coil or winding in an electric circuit. When stimulated magnetically by the field, the core becomes slightly mechanically deformed or distorted by magnetostriction. The resulting increment of deformation may be a lengthening, or a shortening, or some other distortion, depending on the material and on the polarity of the increment of the magnetic field. Conversely, when the vibrator is mechanically deformed or distorted, it will react or respond magnetically by magnetostriction with an increment of magnetization depending upon the nature of the preexisting magnetic field and the mechanical deformation. The mechanical deformation is produced by exciting reversible internal stresses in the core and the core readily recovers upon the withdrawal of the deforming forces.

The invention will be explained in greater detail in connection with the accompanying drawings, in which Fig. 1 is a diagrammatic view of apparatus and circuits constructed and arranged to illustrate a principle of the present invention; Fig. 2 is a section of a vibrator particularly designed for producing sound in water, the section being taken upon the line 2—2 of Fig. 3, looking in the direction of the arrows; Fig. 3 is an elevation of the same; Figs. 4 and 5 are views similar to Figs. 2 and 3, respectively, of a modification; Fig. 6 is a diagrammatic cross section of a ship, showing a vibrator spanning the hull thereof; and Fig. 7 is a diagrammatic view of a transmitting-and-receiving system according to the present invention, it being understood that either end of the system may be operated either to transmit or to receive.

A core 2 is shown in Fig. 1 axially positioned in and driven by an inductive field solenoid coil 10. The core 2 is shown in Fig. 1 held in place by means of two centrally positioned clamps 6 and 8 so as freely to vibrate longitudinally about a nodal point at its center. The core 2 may be in the form of a tube, or a rod, or it may be otherwise constructed, as explained in the said Letters Patent. As is also described in the said Letters Patent, it is preferably of nickel, nickel-steel, nickel-copper, nickel-cobalt, chrome-nickel, chrome steel, or of any other metal element or alloy characterized by comparatively large magnetostrictive effects and comparatively low vibrational decrement. By proper choice of length and other dimensions, the apparatus may be made applicable to systems of high or low frequency within a range that may extend from a hundred cycles to hundreds of thousands of cycles.

The coil 10 is provided with conductors 12 and 14 by which it may be connected, for simplicity, in series with a source of alternating electromotive force, such as an alternating current generator 16, for passing an actuating period current through the coils 10. Other, more complicated, sources of alternating current are illustrated in other figures of the above-entitled Letters Patent. A local battery 18, in series with the source 16 and the winding 10, applies a steady magnetizing field to the core 2, over which the alternating field produced by the generator 16 is superposed, so as to polarize the core 2. A similar polarizing battery is shown at 93 in Fig. 7. The electrical circuit thorugh the energizing coils should preferably be tuned, as by the condenser 92, in order to obtain maximum driving current through the coils. The alternating field is preferably smaller than the steady field, in order that the combined fields may not, at any time, fall to zero. The battery may be dispensed with, and the core may be magnetized electromagnetically by a local source, or it may be permanently magnetized, instead, or the battery and a permanently magnetized core may be employed together.

If the current or voltage is alternating, the electromagnetic field created thereby will also be alternating. The core 2 will, therefore, increase and decrease in length (let us say) many times a second, every variation in the current producing its stimulative effect on the core 2, and every deformation of the core producing its reaction response upon the current. The core 2 will, in consequence, vibrate mechanically by magnetostriction about a nodal point at its center, with a period of vibration equal to the period of the alternating electromotive force. Ordinarily, these vibrations will be quite small. When the alternating frequency is close to, or substantially the same as, the natural frequency of mechanical vibration of the core 2, however, the amplitude of vibration of the core, though still small, becomes relatively quite large. The core 2 will then react inductively on the load to render its consumption of power critical as to frequency for frequencies near the free frequency of the core. By proper choice of length and other dimensions, as before stated, the cores 2 may be proportioned effectively to transmit vibrational stresses lengthwise of the cores 2 to and from the hereinafter described diaphragm means. The mechanical damping of the core, mounted as shown, may be made small, with the result that the resonant response of the core is very sharp and pronounced. Of course, there will usually be more than one specific frequency of magnetization at which the core will thus resonate; for in addition to one or more natural fundamental frequencies of mechanical vibration, it has also frequencies of vibration determined by the operation of the core in halves, thirds, fourths, fifths, etc., as is explained more at length in the said Letters Patent, and it will be sufficient here to remember that the operation described herein is equally applicable to the fundamentals and their overtones.

According to the present invention, the magnetostrictive core is adapted, as a sonic oscillator, for the production of sounds of any desired frequency, particularly high frequencies, for sonorously communicating through water or other dense media. One or more cores 2, of highly magnetostrictive material, are shown attaced to one or more diaphragms 58, Figs. 2 to 5, positioned in the water or other medium. The diaphragms have restricted areas, as shown, to which their sonorous vibration is confined. The cores 2 are surrounded by coils 22 that may be connected together, either in parallel or in series, as desired, and through which are passed an actuating periodic current superposed over a magnetizing direct current, as before described. The fields of adjacent coils may be reversed, so that the lines of force may go to the right through one set of cores 2 and to the left through the alternately placed set of cores 2. When sharply resonant operation at a single frequency is desired, the magnetizing current may be passed through auxiliary coils, if desired. The cores are preferably free from contact with the coils, so as to reduce friction, which would prevent free vibration. The mechanical system is tuned to the desired frequency, in the medium in which it is to be used, thus enormously increasing, with the electrical tuning, the radiation of sound from the transmitter. The diaphragm means and its cores 2 may be so designed as to elasticity, length and other dimensions, and associated mass, as to have, as a unit, a natural period of mechanical vibration resonant to the frequency of the periodic current in the coils 22. In some cases, it may be desirable to utilize one vibratory transmitter at a number of frequencies in a given frequency range. For such purposes, it will be desirable to broaden the resonance curve of the mechanical vibrator by the introduction of mechanical damping, so as to increase the response of the vibrator to frequencies removed from its resonant frequency.

The diaphragm means and its cores 2 may be so designed as to elasticity, length and other dimensions, and associated mass, as to have, as a unit, a natural period of mechanical vibration resonant to the frequency of the periodic current in the coils 22. The chamber in which the coils are contained is sealed against the entry of water when submerged, as by means of a yielding, cylindrical band 60. When the electrical system is electrically tuned, it has, of course, a substantially zero reactance, the inductance and the capacitance being of equal magnitude and opposite sign.

In the modification of Figs. 4 and 5, one of the radiating faces is constituted of the free ends of the cores 2, each having a small cap-plate 62. The magnetostrictive vibrators are thus constituted of a plurality of magnetostrictive bodies separately dimensioned for resonantly cooperating with the diaphragm means, in their expansion and contraction, to interchange energy with the sound-conveying medium. By their magnetostrictive expansion and contraction, under the action of currents in the coils 22, the cores 2 will cooperate with the coils 22 to vibrate the diaphragm means to produce radiation of sound into the medium. By their expansion and contraction in response to the incidence of sound in the medium upon the diaphragm means, the cores 2 will cooperate with the coils 22 to generate electric voltages in the coils 22. Alternatively, the single diaphragm 58 may be utilized as the radiating surface, in which case the caps 62 are dimensioned to act effectively as an inertia load on the cores to adapt the vibrations of the device to the mechanical characteristics of the medium in which it is used. The diaphragms 58 may be square, as illustrated, or they may be circular or rectangular. The driving cores are preferably distributed over a substantial portion of the diaphragm surface. A multiple unit of this character will produce greater power than a single unit of corresponding area, and is freer from eddy-current and hysteresis losses, besides being more flexible, so as more easily to conform elastically to the nature of the medium in which it is operating. The number of magnetostrictive elements, their distribution and their lengths are of magnitudes suitable to easy adjustment for a predetermined resonant system designed to operate at any given frequency, within a wide range as, for example, 10,000 or 40,000 cycles per second. The distribution of driving members permits the ready radiation and distribution of heat, and lends itself to the use of large amounts of power. With thirty seven magnetostrictive driving elements, more than a kilowatt of power can be supplied to the system at 30,000 cycles per second; and, by a large number of elements, proportionally larger power may be used. The multiple-driven diaphragm is elastically supported at properly spaced distributed areas, capable of sharp and effective tuning, with a large radiating face, and the system has low, mechanical internal-power losses, capable of high rigidity, or of a rigidity adaptable to the medium in which it is used, by the choice of areas and distribution of driving elements. The system is also characterized by great durability, constancy, and high efficiency. The magnetostrictive drive produces an elasticity and rigidity determined in large part by the driving cores themselves. A distribution of these members over the face of the diaphragm supplies rigidity to it at a multitude of points and insures a more uniform elasticity for the whole radiating diaphragm.

According to the modification of Fig. 6, the magnetostrictive core 2 is attached to the inner opposite sides 64 and 66 of a ship. These sides will themselves act as sound radiators through the water when properly tuned, alternating current is sent through the coils 22. The system is particularly effective when the vibrator is connected in circuit with an amplifier. Here the frequency will be low, as for audible signalling. As before explained, the magnetostrictive element should be polarized by a direct-current battery, or through an auxiliary winding. For certain frequencies, as at 1,000 cycles, the core may be directly driven, as by the generator 16. If desired, it may be driven by a vacuum tube, as illustrated in Fig. 7, or by other vacuum-tube apparatus, such as a power amplifier. The vibrator attached to the ship may, of course, be of the forms illustrated in Figs. 2 to 5. To get the maximum amplitude of the previously designed vibrator, the electrical characteristics of the circuit will be properly tuned, as before explained. This tuning may be effected by suitably tuning the generator 16.

A sending-and-receiving system is illustrated in Fig. 7, using sound as the agency of communication. The transmitting apparatus comprises a vacuum tube 74, the output circuit of which, between the filament or cathode 26 and the plate or anode 28, is provided with a coil 76 that is coupled to a coil 78. The grid is shown at 32. The coil 78 is connected in circuit with a tuning condenser 92 and the energizing coil 81 of a suitably oriented, magnetostrictive vibrator 80. The vibrator 80 may be polarized by a parallel feed consisting of a source 93 of direct or alternating potential, and containing a choke coil 94 for confining the oscillatory current to the circuit containing the energizing coil 81. The energy of the vacuum tube 74 is thus magnetostrictively transmitted to the sound-radiating vibrator 80, which may be of the form disclosed in Figs. 2 to 5; and it may, in fact, be the vibrator 2 of Fig. 6. The sound so radiated is received by a suitably oriented, sound-receiving vibrator 82 of a receiving system. The energizing coil 83 of the vibrator 82 is connected in circuit with a tuning condenser 95 and a coil 84, a choke coil 97 and a potential source 99 being provided similar to the elements 94 and 93. The coil 84 is coupled to a coil 86 of a receiving vacuum tube 88 that is connected with a telephone 90. Additional tuning condensers 98 and 100 may be employed for the transmitter and the receiver. The generator and associated parts will, as before, be electrically tuned.

The term "sound", as used herein, includes not merely audible sound, but all vibrations of a similar nature, including superaudible vibrations. If the sound frequency employed is above the audible range, the heterodyne principle may be used to render the signal audible. The system finds particular value at superaudible frequencies, the period of vibration of the restricted area of the diaphragm means, and the consequent sound wavelength transmitted or received, being small enough, relative to the restricted area of the diaphragm means, so that the system shall be directively discriminating as to the sound, thus rendering the diaphragm means directive. Instead of the inductive coupling shown in Fig. 7, other methods of coupling used in related arts may be employed.

It will readily be understood, without further description, that the coils of a single vibrator may be connected either to a transmitting or a receiving apparatus, as by means of suitable switching arrangements and, indeed, that each such apparatus may, in itself, be used either as a sending or a receiving apparatus. Other modifications, too, will be obvious to persons skilled in the art, and all such are considered to fall within the spirit and scope of the present invention, as defined in the appended claims.

What is claimed is:

1. A frequency-discriminating sound transmitter having, in combination, a mechanical vibratory system comprising diaphragm means adapted to be positioned in relation to a sound-conveying medium to produce radiation of sound into the medium by means of its sonorous vibration, and core means of highly magnetostrictive material affixed to the diaphragm means, coil means for magnetizing the core means, the cross-sectional area of the metal of the core means being small relative to the area of the diaphragm means, but the core means being proportioned, and distributed over the surface of the diaphragm means, effectively to transmit vibrational stresses lengthwise of the core means to and from the diaphragm means in order to enable the core means to cooperate with the coil means, by its magnetostrictive expansion and contraction under the action of currents in the coil means, to vibrate the diaphragm means, and a source of currents of predetermined frequency higher than speech frequencies connected with the coil means, the source of currents being of sufficiently high power and the coil means having sufficient current-carrying capacity to effect sufficient vibratory movement of the diaphragm means to produce substantial radiation of sound into the medium, and the source of currents being selective as to frequency, to produce vibratory magnetostrictive expansion and contraction of the core means at the said predetermined frequency.

2. A frequency-discriminating sound transmitter having, in combination, a mechanical vibratory system comprising diaphragm means adapted to be positioned in relation to a sound-conveying medium to produce radiation of sound into the medium by means of its sonorous vibration, and core means of highly magnetostrictive material affixed to the diaphragm means, coil means for magnetizing the core means, the cross-sectional area of the metal of the core means being small relative to the area of the diaphragm means, but the core means being proportioned, and distributed over the surface of the diaphragm means, effectively to transmit vibrational stresses lengthwise of the core means to and from the diaphragm means in order to enable the core means to cooperate with the coil means, by its magnetostrictive expansion and contraction under the action of currents in the coil means, to vibrate the diaphragm means, a source of currents of predetermined frequency higher than speech frequencies connected with the coil means, the source of currents being of sufficiently high power and the coil means having sufficient current-carrying capacity to effect sufficient vibratory movement of the diaphragm means to produce substantial radiation of sound into the medium, the source of currents being selective as to frequency, to produce vibratory magnetostrictive expansion and contraction of the core means at the said predetermined frequency, the core means being dimensioned and tuned to cooperate effectively in its vibration with the currents of the said predetermined frequency, and means for adjusting the predetermined frequency into resonance with the frequency of the mechanical system.

3. A frequency-discriminating sound transmitter having, in combination, a mechanical vibratory system having a natural period of vibration and comprising a diaphragm adapted to be positioned in relation to a sound-conveying medium to produce radiation of sound into the medium by means of its sonorous vibration, and core means of highly magnetostrictive material affixed to the diaphragm, the diaphragm having a restricted area to which its sonorous vibration is confined, the said area being of linear dimensions large compared with the effective wave length of transmission, the diaphragm and the core means having elastic and mass constants and dimensions of values to cause the diaphragm and the core means both to contribute substantially to the said natural period of vibration of the mechanical system, the vibrational constants and spatial distribution of the core means cooperating with the diaphragm forces to facilitate piston-wise cophasing of the parts of the diaphragm at the said effective wave length, coil means for magnetizing the core means, the cross-sectional area of the metal of the core means being small relative to the area of the diaphragm, but the core means being proportioned, and distributed over the surface of the diaphragm, effectively to transmit vibrational stresses lengthwise of the core means to and from the diaphragm in order to enable the core means to cooperate with the coil means, by its magnetostrictive expansion and contraction under the action of currents in the coil means, to vibrate the diaphragm piston-wise, and a source of currents of predetermined frequency higher than speech frequencies connected with the coil means, the source of currents being of sufficiently high power and the coil means having sufficient current-carrying capacity to effect sufficient vibratory movement of the diaphragm means to produce substantial radiation of sound into the medium, and the source being selective as to frequency, to produce vibratory magnetostrictive expansion and contraction of the core means at the said predetermined high frequency.

4. A frequency-discriminating sound transmitter having, in combination, a mechanical vibratory system comprising diaphragm means adapted to be positioned in relation to a sound-conveying medium to produce radiation of sound into the medium by means of its sonorous vibration, and core means of highly magnetostrictive material affixed to the diaphragm means, coil means for magnetizing the core means, the cross-sectional area of the metal of the core means being small relative to the area of the diaphragm means, but the core means being proportioned, and distributed over the surface of the diaphragm means, effectively to transmit vibrational stresses lengthwise of the core means to and from the diaphragm means in order to enable the core means to cooperate with the coil means, by its magnetostrictive expansion and contraction under the action of currents in the coil means, to vibrate the diaphragm means, a vacuum-tube source of oscillatory current of predetermined frequency higher than speech frequencies having a source of power and an output circuit, and means connecting the coil means with the output circuit, the vacuum-tube source being selective as to frequency, to produce vibratory magnetostrictive expansion and contraction of the core means at the said predetermined frequency.

5. A frequency-discriminating sound transmitter having, in combination, a mechanical vibratory system comprising diaphragm means adapted to be positioned in relation to a sound-conveying medium to produce radiation of sound into the medium by means of its sonorous vibration, and core means of highly magnetostrictive material affixed to the diaphragm means, coil means for magnetizing the core means, the cross-sectional area of the metal of the core means being small relative to the area of the diaphragm means, but the core means being magnetically polarized and proportioned, and distributed over the surface of the diaphragm means, effectively to transmit vibrational stresses lengthwise of the core means to and from the diaphragm means in order to enable the core means to cooperate with the coil means, by its magnetostrictive expansion and contraction under the action of currents in the coil means, to vibrate the diaphragm means, and a source of currents of predetermined frequency higher than speech frequencies connected with the coil means, the source of currents being of sufficiently high power and the coil means having sufficient current-carrying capacity to effect sufficient vibratory movement of the diaphragm means to produce substantial radiation of sound into the medium, and the source of currents being selective as to frequency, to produce vibratory magnetostrictive expansion and contraction of the core means at the said predetermined frequency.

GEORGE W. PIERCE.